US012418387B2

United States Patent
Zhang et al.

(10) Patent No.: US 12,418,387 B2
(45) Date of Patent: Sep. 16, 2025

(54) METHODS AND APPARATUS FOR DYNAMIC SCHEDULING OF SUB-BAND FULL DUPLEX COMMUNICATIONS

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Abdelrahman Mohamed Ahmed Mohamed Ibrahim, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 17/870,539

(22) Filed: Jul. 21, 2022

(65) Prior Publication Data

US 2024/0031116 A1     Jan. 25, 2024

(51) Int. Cl.
*H04L 5/14*          (2006.01)
*H04W 72/0446*    (2023.01)
*H04W 72/0453*    (2023.01)
*H04W 72/23*       (2023.01)

(52) U.S. Cl.
CPC ........... *H04L 5/14* (2013.01); *H04W 72/0446* (2013.01); *H04W 72/0453* (2013.01); *H04W 72/23* (2023.01)

(58) Field of Classification Search
CPC . H04W 72/12; H04W 72/23; H04W 72/0453; H04W 72/535
See application file for complete search history.

(56) References Cited

U.S. PATENT DOCUMENTS

| | | | | |
|---|---|---|---|---|
| 2017/0346616 | A1* | 11/2017 | Liu | H04L 5/0044 |
| 2018/0097607 | A1* | 4/2018 | Ji | H04W 72/23 |
| 2020/0389876 | A1* | 12/2020 | Islam | H04L 5/0094 |
| 2022/0159659 | A1* | 5/2022 | Hosseini | H04W 24/08 |
| 2023/0163936 | A1 | 5/2023 | Awadin et al. | |
| 2023/0292304 | A1* | 9/2023 | Oh | H04W 72/23 |

FOREIGN PATENT DOCUMENTS

| | | |
|---|---|---|
| EP | 3249986 A1 | 11/2017 |
| WO | 2022014892 A1 | 1/2022 |

OTHER PUBLICATIONS

International Search Report and Written Opinion—PCT/US2023/069311—ISA/EPO—Oct. 30, 2023.

* cited by examiner

*Primary Examiner* — Mahran Y Abu Roumi
(74) *Attorney, Agent, or Firm* — Arent Fox, LLP

(57) ABSTRACT

Aspects of the present disclosure provide techniques for sub-band conversion or cancellation for dynamic scheduling of sub-band full duplex (SBFD) operations between the base station and UEs. The capability to communicate via simultaneous UL and DL transmissions through dynamic scheduling allows for increased uplink duty cycle leading to latency reduction (e.g., it is possible to receive DL signal in an UL only slots, which can enable latency savings) and improved uplink coverage. Additionally enabling flexible and dynamic UL and DL resource adaptation in accordance with techniques of the present disclosure also provide enhanced system capacity, resource utilization, and spectrum efficiency.

22 Claims, 14 Drawing Sheets

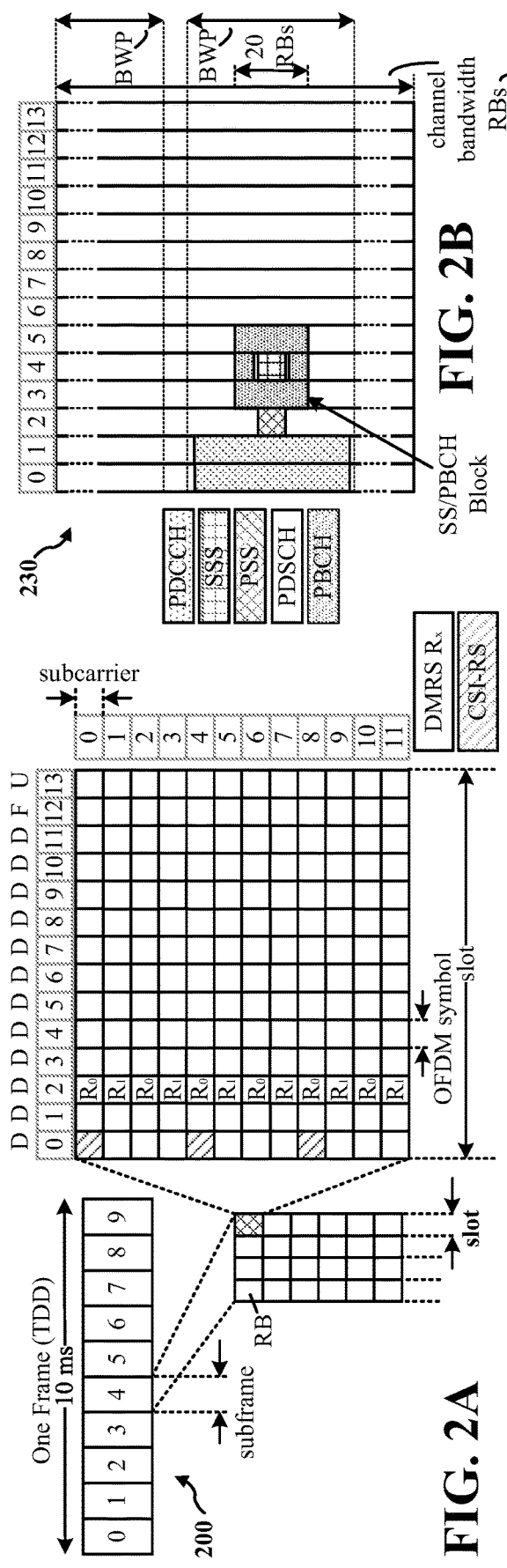
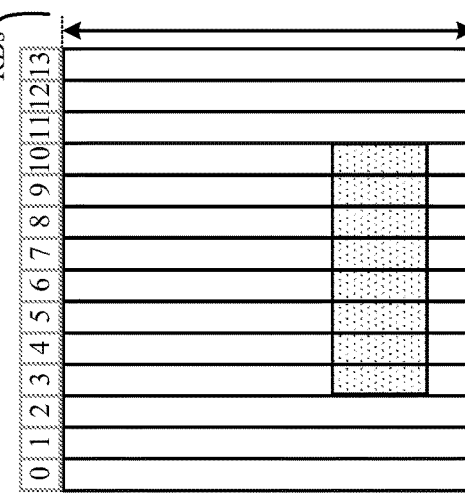
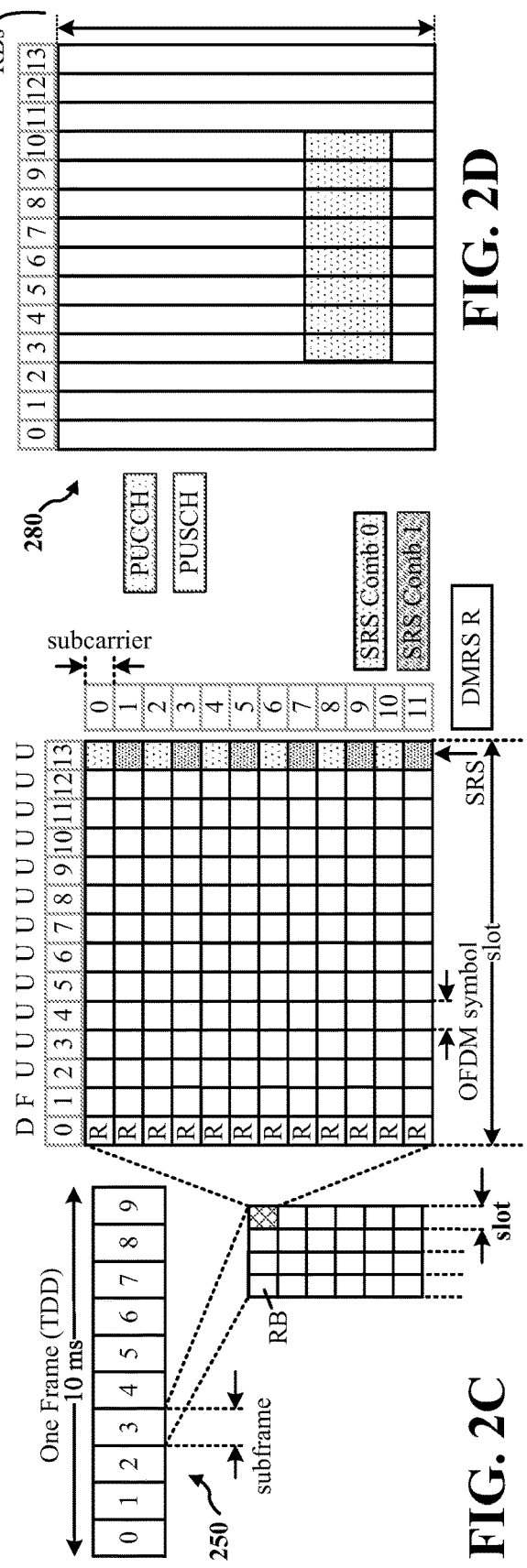
FIG. 2A
FIG. 2B
FIG. 2C
FIG. 2D

Receiving, at a user equipment (UE), a configuration message from a base station that modifies an initial sub-band full duplex (SBFD) resource configuration that is allocated for communication between the base station and the UE, wherein the initial SBFD resource configuration allows for both downlink and uplink communications on a sub-band basis within a same slot such that at least a first portion of the bandwidth within a first slot is allocated for uplink communication and at least a second portion of the bandwidth within the first slot is allocated for downlink communication ⎯ 605

Communicating with the base station on a revised SBFD resource configuration based on the configuration message received from the base station, wherein the revised SBFD resource configuration modifies at least one of the first portion of the bandwidth within the first slot that was originally allocated for the uplink communication or the second portion of the bandwidth within the first slot that was originally allocated for the downlink communication in the initial SBFD resource configuration ⎯ 610

FIG. 6            600

METHODS AND APPARATUS FOR DYNAMIC SCHEDULING OF SUB-BAND FULL DUPLEX COMMUNICATIONS

BACKGROUND

Technical Field

The present disclosure generally relates to communication systems, and more particularly, to implementing dynamic scheduling for sub-band full duplex (SBFD) communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

There exists a need for further improvements in 5G NR technology. These improvements may also be applicable to other multi-access technologies and the telecommunication standards that employ these technologies. For instance, improvements to efficiency and latency relating to mobility of user equipments (UEs) communicating with network entities are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example aspect includes a method of wireless communication by a user equipment, comprising receiving, at a user equipment (UE), a configuration message from a base station that modifies an initial SBFD resource configuration that is allocated for communication between the base station and the UE. In some examples, the initial SBFD resource configuration may allow for both downlink and uplink communications on a sub-band basis within a same slot such that at least a first portion of the bandwidth within a first slot is allocated for uplink communication and at least a second portion of the bandwidth within the first slot is allocated for downlink communication. The method further includes communicating with the base station on a revised SBFD resource configuration based on the configuration message received from the base station. The revised SBFD resource configuration may modify at least one of the first portion of the bandwidth within the first slot that was originally allocated for the uplink communication or the second portion of the bandwidth within the first slot that was originally allocated for the downlink communication in the initial SBFD resource configuration.

Another example aspect includes an apparatus for wireless communication by a user equipment, comprising a memory and processor coupled with the memory. The processor is configured to receive, at the UE, a configuration message from a base station that modifies an initial SBFD resource configuration that is allocated for communication between the base station and the UE. In some examples, the initial SBFD resource configuration may allow for both downlink and uplink communications on a sub-band basis within a same slot such that at least a first portion of the bandwidth within a first slot is allocated for uplink communication and at least a second portion of the bandwidth within the first slot is allocated for downlink communication. The processor is further configured to communicate with the base station on a revised SBFD resource configuration based on the configuration message received from the base station. The revised SBFD resource configuration may modify at least one of the first portion of the bandwidth within the first slot that was originally allocated for the uplink communication or the second portion of the bandwidth within the first slot that was originally allocated for the downlink communication in the initial SBFD resource configuration.

Another example includes an apparatus for wireless communication by a user equipment, comprising means for receiving, at a user equipment (UE), a configuration message from a base station that modifies an initial SBFD resource configuration that is allocated for communication between the base station and the UE. In some examples, the initial SBFD resource configuration may allow for both downlink and uplink communications on a sub-band basis within a same slot such that at least a first portion of the bandwidth within a first slot is allocated for uplink communication and at least a second portion of the bandwidth within the first slot is allocated for downlink communication. The apparatus further includes means for communicating with the base station on a revised SBFD resource configuration based on the configuration message received from the base station. The revised SBFD resource configuration may modify at least one of the first portion of the bandwidth within the first slot that was originally allocated for the uplink communication or the second portion of the bandwidth within the first slot that was originally allocated for the downlink communication in the initial SBFD resource configuration.

Another example includes a non-transitory computer readable medium storing instructions, executable by a processor, for wireless communications. The instructions, executable by the processor, include instructions for receiving, at a user equipment (UE), a configuration message from a base station that modifies an initial SBFD resource configuration that is allocated for communication between the base station and the UE. In some examples, the initial SBFD resource configuration may allow for both downlink and uplink communications on a sub-band basis within a same slot such that at least a first portion of the bandwidth within a first slot is allocated for uplink communication and at least a second portion of the bandwidth within the first slot is allocated for downlink communication. The instructions, executable by the processor, further includes instructions for includes communicating with the base station on a revised SBFD resource configuration based on the configuration message received from the base station. The revised SBFD resource configuration may modify at least one of the first portion of the bandwidth within the first slot that was originally allocated for the uplink communication or the second portion of the bandwidth within the first slot that was originally allocated for the downlink communication in the initial SBFD resource configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 6 is a flow diagram of an example of a method of wireless communication implemented by the UE in accordance with aspects of the present disclosure.

DETAILED DESCRIPTION

Figure 1A:
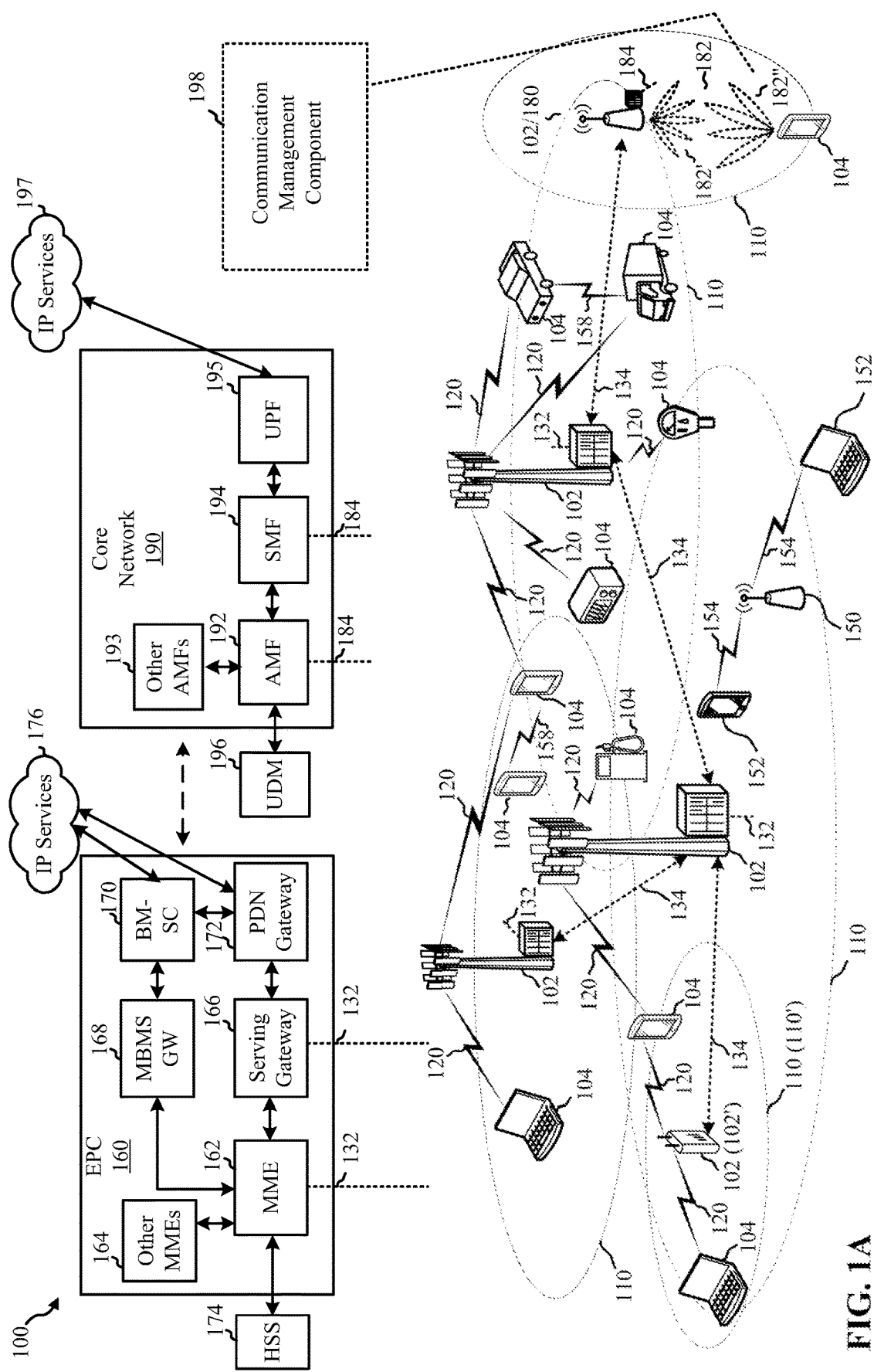
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventional communication methods may use half duplex communications between devices. Examples of half-duplex communications include time division duplexing (TDD) and frequency division duplexing (FDD). In an example, in a half-duplex scheme each slot may be designated as a slot for downlink (DL) transmissions or a slot for an uplink (UL) transmissions. Examples of a DL transmission include physical downlink control channel (PDCCH), physical downlink shared channel (PDSCH), and physical broadcast channel (PBCH). Examples of a UL transmission include physical uplink control channel (PUCCH) and physical uplink shared channel (PUSCH).

In contrast to half duplex communications, full duplex communications allow devices to communicate via simultaneous UL and DL transmissions. Sub-band full duplex (SBFD) schemes allow full duplex communications by partitioning slots into both UL transmissions and DL transmissions, as described herein. In an example, a base station may partition component carriers (CC) into UL bandwidths and DL bandwidths to improve cell edge coverage with minimal loss in throughput relative to baseline time division duplex (TDD) macro. Specifically, a UE may transmit UL information (e.g., data or control information) to a base station in the same slot as DL transmissions from the base station, instead of waiting for a next available UL transmission slot, as is the case in conventional half duplex communications. Frequency-division duplex (FDD) may be applied across CCs or within CCs in the case of carrier aggregation in unpaired spectrum.

Aspects of the present disclosure provide techniques for sub-band conversion or cancellation for dynamic scheduling of SBFD operations between the base station and UEs. The capability to communicate via simultaneous UL and DL transmissions through dynamic scheduling allows for increased uplink duty cycle leading to latency reduction (e.g., it is possible to receive DL signal in an UL only slots, which can enable latency savings) and improved uplink coverage. Additionally enabling flexible and dynamic UL and DL resource adaptation in accordance with techniques of the present disclosure also provide enhanced system capacity, resource utilization, and spectrum efficiency.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system 100 (also referred to as a wireless wide area network (WWAN)) that includes base stations 102 (also referred to herein as network entities), user equipment(s) (UE) 104, an Evolved Packet Core (EPC) 160, and another core network 190 (e.g., a 5G Core (5GC)).

One or more of the UE 104 may include a communication management component 198, wherein the communication management component 198 are operable to perform techniques for sub-band conversion or cancellation for dynamic scheduling of SBFD operations between the base station and one or more UEs.

Figure 5:
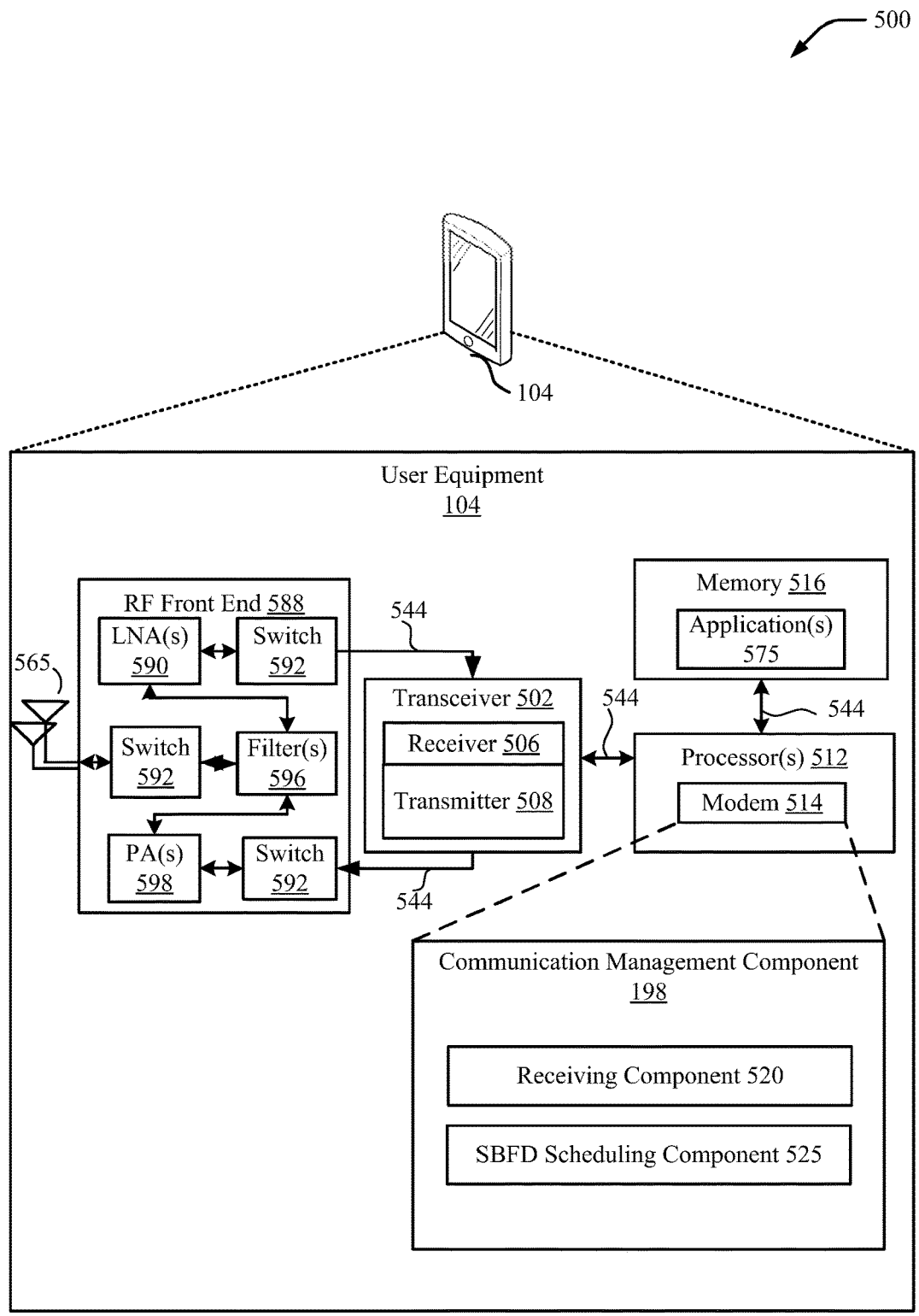
FIG. 5 is a schematic diagram of an example implementation of various components of a user equipment in accordance with various aspects of the present disclosure.

At one or more of the UEs 104, and additionally referring to FIG. 5, the communication management component 198 includes a receiving component 520 configured to receive, at the UE, a configuration message from a base station that modifies an initial SBFD resource configuration that is allocated for communication between the base station and the UE. The initial SBFD resource configuration may allow for both downlink and uplink communications on a sub-band basis within a same slot such that at least a first portion of the bandwidth within a first slot is allocated for uplink communication and at least a second portion of the bandwidth within the first slot is allocated for downlink communication. Conversely, the initial SBFD resource configuration may include at least a first portion of the bandwidth within a first slot is allocated for downlink communication and at least a second portion of the bandwidth within the first slot is allocated for uplink communication. In other examples, one or more sub-bands within the SBFD slot may be allocated for flexible communications (e.g., either UL or DL communications based on the traffic).

The communication management component 198 may also include a SBFD scheduling component 525 that in conjunction with the transceiver is configured to communicate with the base station on a revised SBFD resource configuration based on the configuration message received from the base station. The revised SBFD resource configuration may modify at least one of the first portion of the bandwidth within the first slot that was originally allocated for the uplink communication or the second portion of the bandwidth within the first slot that was originally allocated for the downlink communication in the initial SBFD resource configuration The base stations (or network entities) 102 may include macrocells (high power cellular base station) and/or small cells (low power cellular base station). The macrocells include base stations. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs. Any of the disaggregated components in the D-RAN and/or O-RAN architectures may be referred to herein as a network entity.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a network entity, gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 1B:
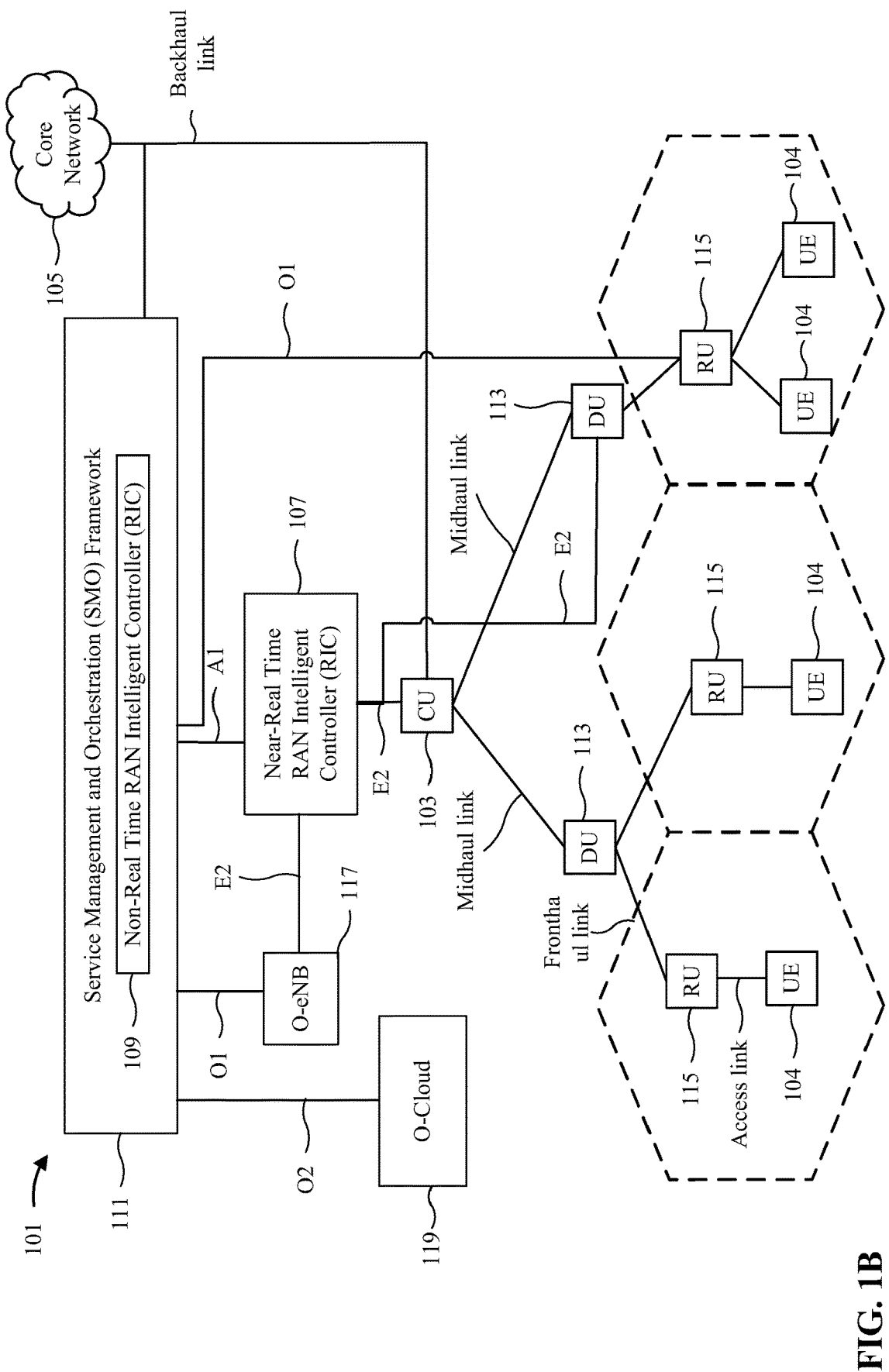
FIG. 1B is a diagram illustrating an example of disaggregated base station architecture, in accordance with various aspects of the present disclosure.

FIG. 1B is a diagram illustrating an example of disaggregated base station 101 architecture, any component or element of which may be referred to herein as a network entity. The disaggregated base station 101 architecture may include one or more central units (CUs) 103 that can communicate directly with a core network 105 via a backhaul link, or indirectly with the core network 105 through one or more disaggregated base station units (such as a Near-Real Time (Near-RT) RAN Intelligent Controller (RIC) 107 via an E2 link, or a Non-Real Time (Non-RT) RIC 109 associated with a Service Management and Orchestration (SMO) Framework 111, or both). A CU 103 may communicate with one or more distributed units (DUs) 113 via respective midhaul links, such as an F1 interface. The DUs 113 may communicate with one or more radio units (RUs) 115 via respective fronthaul links. The RUs 115 may communicate with respective UEs 104 via one or more radio frequency (RF) access links. In some implementations, the UE 104 may be simultaneously served by multiple RUs 115.

Each of the units, e.g., the CUs 103, the DUs 113, the RUs 115, as well as the Near-RT RICs 107, the Non-RT RICs 109 and the SMO Framework 111, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 103 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 103. The CU 103 may be configured to handle user plane functionality (i.e., Central Unit-User Plane (CU-UP)), control plane functionality (i.e., Central Unit-Control Plane (CU-CP)), or a combination thereof. In some implementations, the CU 103 can be logically split into one or more CU-UP units and one or more CU-CP units. The CU-UP unit can communicate bidirectionally with the CU-CP unit via an interface, such as the E1 interface when implemented in an O-RAN configuration. The CU 103 can be implemented to communicate with the DU 113, as necessary, for network control and signaling.

The DU 113 may correspond to a logical unit that includes one or more base station functions to control the operation of one or more RUs 115. In some aspects, the DU 113 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 113 may further host one or more low PHY layers. Each layer (or module) can be implemented with an interface configured to communicate signals with other layers (and modules) hosted by the DU 113, or with the control functions hosted by the CU 103.

Lower-layer functionality can be implemented by one or more RUs 115. In some deployments, an RU 115, controlled by a DU 113, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 115 can be implemented to handle over the air (OTA) communication with one or more UEs 104. In some implementations, real-time and non-real-time aspects of control and user plane communication with the RU(s) 115 can be controlled by the corresponding DU 113. In some scenarios, this configuration can enable the DU(s) 113 and the CU 103 to be implemented in a cloud-based RAN architecture, such as a vRAN architecture.

The SMO Framework 111 may be configured to support RAN deployment and provisioning of non-virtualized and virtualized network elements. For non-virtualized network elements, the SMO Framework 111 may be configured to support the deployment of dedicated physical resources for RAN coverage requirements which may be managed via an operations and maintenance interface (such as an O1 interface). For virtualized network elements, the SMO Framework 111 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 103, DUs 113, RUs 115 and Near-RT RICs 107. In some implementations, the SMO Framework 111 can communicate with a hardware aspect of a 4G RAN, such as an open eNB (O-eNB) 117, via an O1 interface. Additionally, in some implementations, the SMO Framework 111 can communicate directly with one or more RUs 115 via an O1 interface. The SMO Framework 111 also may include a Non-RT RIC 109 configured to support functionality of the SMO Framework 111.

The Non-RT RIC 109 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 107. The Non-RT RIC 109 may be coupled to or communicate with (such as via an A1 interface) the Near-RT RIC 107. The Near-RT RIC 107 may be configured to include a logical function that enables near-real-time control and optimization of RAN elements and resources via data collection and actions over an interface (such as via an E2 interface) connecting one or more CUs 103, one or more DUs 113, or both, as well as an O-eNB, with the Near-RT RIC 107.

In some implementations, to generate AI/ML models to be deployed in the Near-RT RIC 107, the Non-RT RIC 109 may receive parameters or external enrichment information from external servers. Such information may be utilized by the Near-RT RIC 107 and may be received at the SMO Framework 111 or the Non-RT RIC 109 from non-network data sources or from network functions. In some examples, the Non-RT RIC 109 or the Near-RT RIC 107 may be configured to tune RAN behavior or performance. For example, the Non-RT RIC 109 may monitor long-term trends and patterns for performance and employ AI/ML models to perform corrective actions through the SMO Framework 111 (such as reconfiguration via O1) or via creation of RAN management policies (such as A1 policies).

FIGS. 2A-2D are diagrams of various frame structures, resources, and channels used by UEs 104 and base stations 102/180 for communication. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The sub-carrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
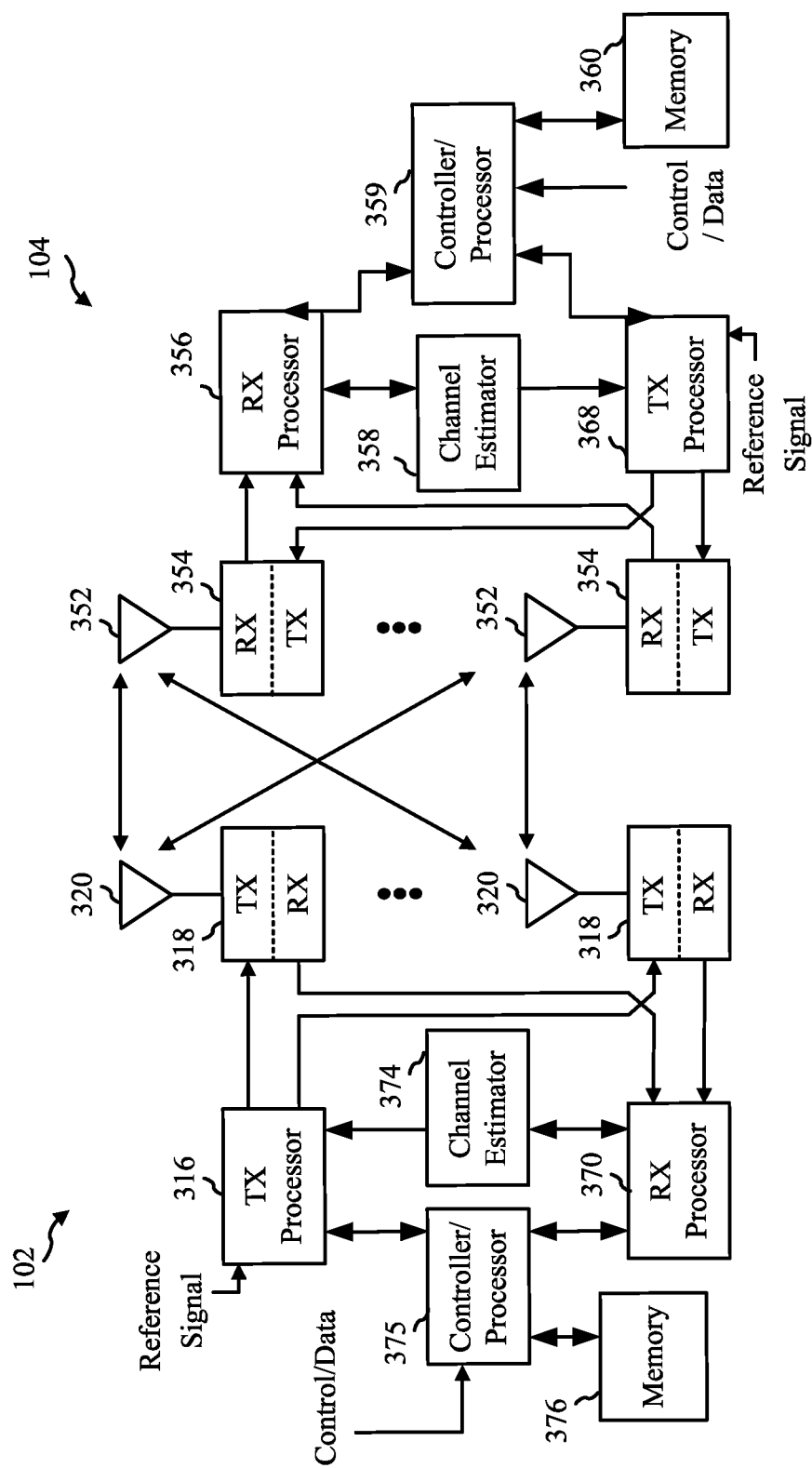
FIG. 3 is a diagram illustrating an example of a base station and user equipment (UE) in an access network.

FIG. 3 is a block diagram of hardware components of the base station 102 (or 180) in communication with the UE 104 in the wireless communication network 100. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. TA. For example, the memory 360 may include executable instructions defining the communication management component 198. The TX processor 368, the RX processor 356, and/or the controller/processor 359 may be configured to execute the communication management component 198.

Figure 4A:
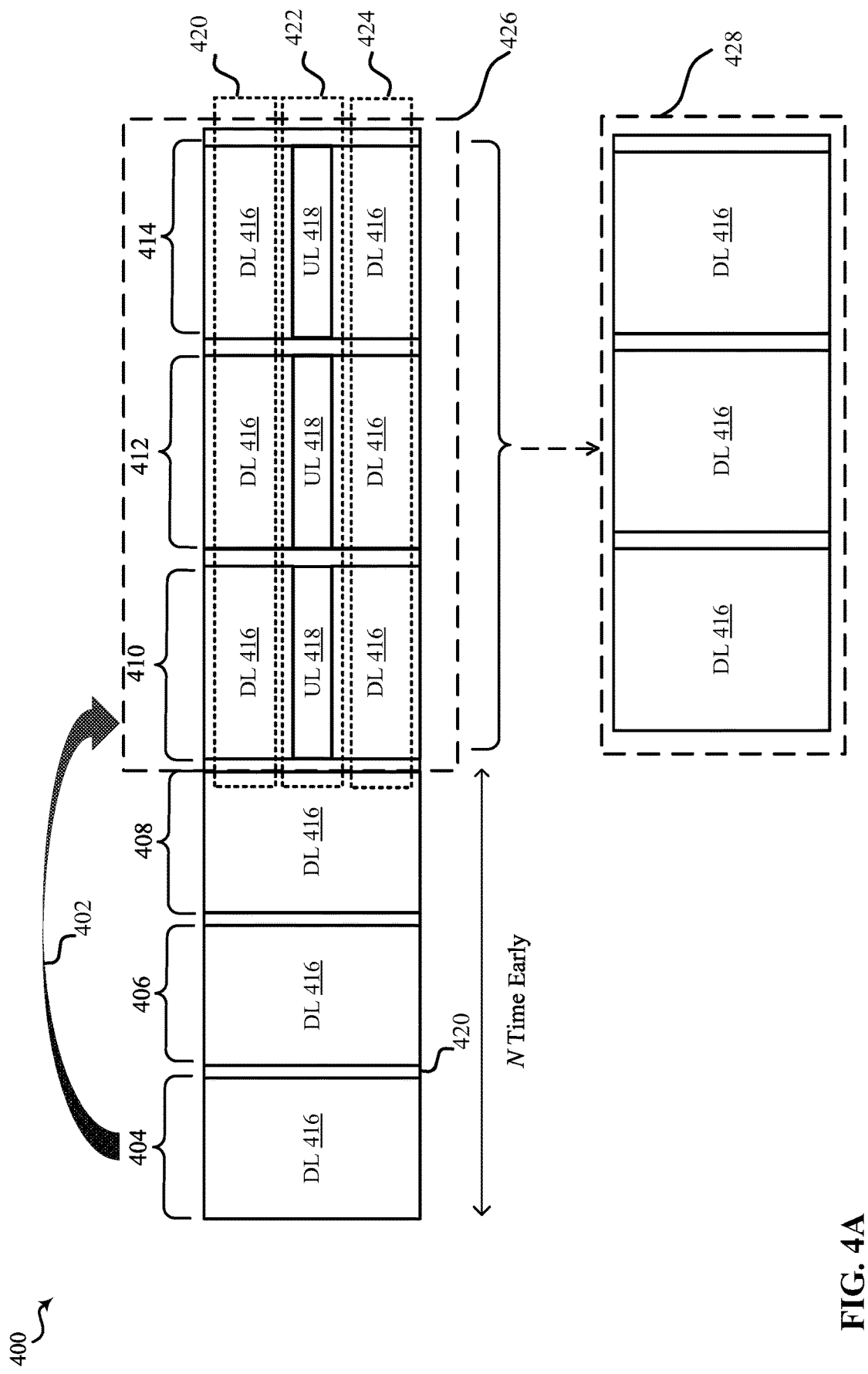
FIG. 4A is one example of dynamics scheduling of SBFD communication resource configuration from initial SBFD resource configuration to revised SBFD resource configuration for SBFD slots.

Referring to FIG. 4A, an example dynamics scheduling of SBFD communication resource configuration 400 allows the base station to transmit configuration messages for scheduling conversion or cancellation of one or more sub-bands (420, 422, 242) within one or more SBFD slots (410, 412, 414). Particularly, as noted above, SBFD allows full duplex communications by partitioning the same slot (e.g., SBFD slot 410), into two or more of DL transmissions 416, UL transmissions 418, or flexible transmissions (see FIG. 4B). A base station may partition CC into UL bandwidths 418 and DL bandwidths 416 in order to improve cell edge coverage with minimal loss in throughput relative to baseline TDD macro. Thus, the UE may transmit UL 418 information (e.g., data or control information) to a base station in the same SBFD slot (e.g., 410, 412, 414) as the DL transmissions 416 from the base station, instead of waiting for a next available UL transmission slot, as is the case in conventional half duplex communications. FDD may be applied across CCs or within CCs in the case of carrier aggregation in unpaired spectrum.

The capability to communicate via simultaneous DL 416 and UL 418 (or flexible) transmissions through dynamic scheduling allows for increased uplink duty cycle leading to latency reduction (e.g., it is possible to receive DL signal in an UL only slots, which can enable latency savings) and improved uplink coverage. Additionally enabling flexible and dynamic UL and DL resource adaptation in accordance with techniques of the present disclosure also provide enhanced system capacity, resource utilization, and spectrum efficiency.

To this end, the communication resource transmission scheme may include a first DL slot 404, a second DL slot 406, and a third DL slot 408 where the entire bandwidth within the slot is reserved for DL communications 416 from the base station to the UE. The communication resource configuration may also include a first SBFD slot 410, a second SBFD slot 412, and a third SBFD slot 414 based on the initial SBFD resource configuration provided by the base station that allows for both DL 416 and uplink 418 communications within the same slot such that at least a first portion of the bandwidth 422 within one or more SBFD slots (410, 412, 414) may be allocated for uplink communication 418 and at least a second portion of the bandwidth (e.g., 420 and 424) within the SBFD slots may be allocated for downlink communication 416. Thus, as shown, different sub-bands within the same slot may be allocated for different communication (e.g., UL or DL).

Figure 4B:
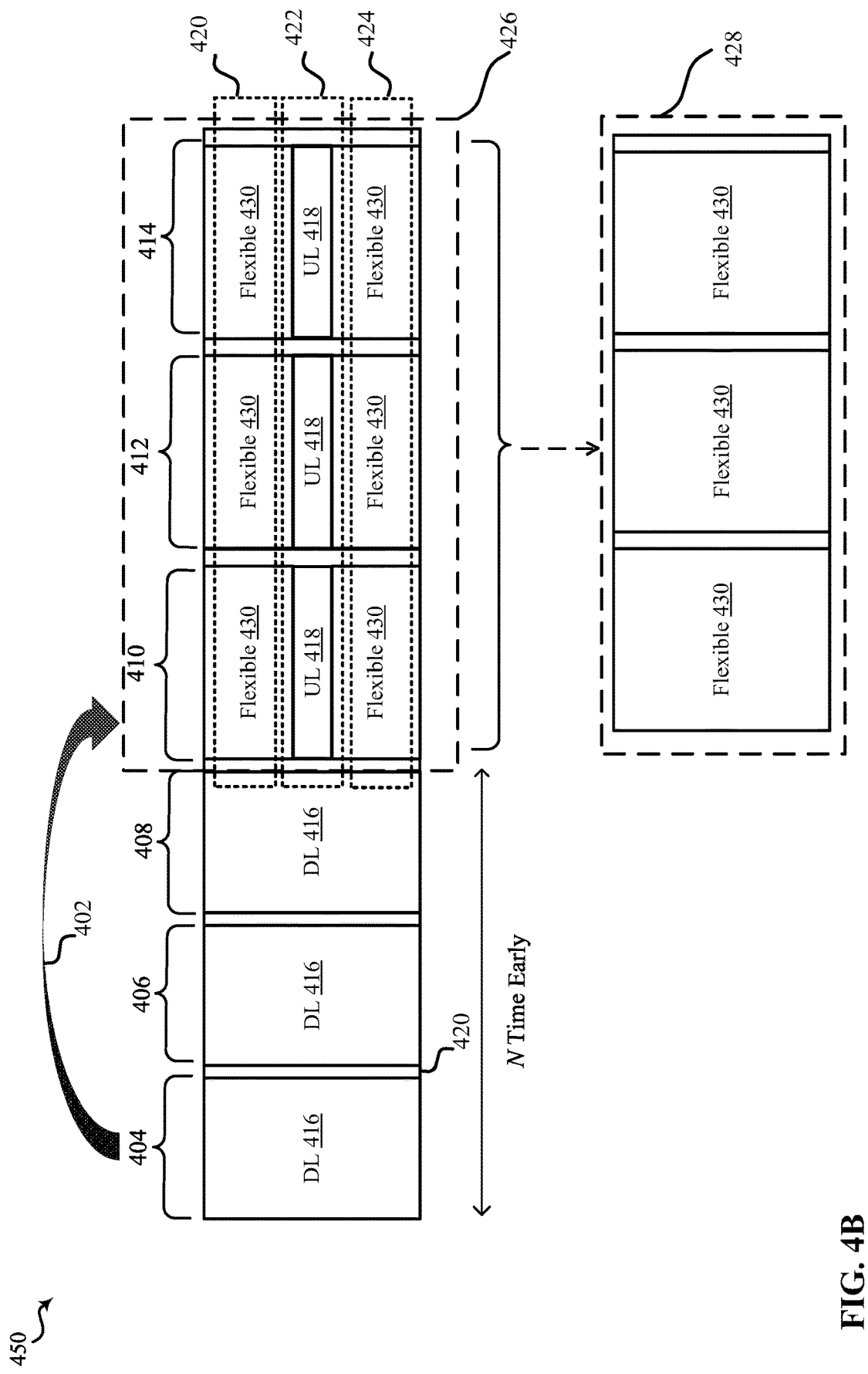
FIG. 4B is another example of dynamics scheduling of SBFD communication resource configuration from initial SBFD resource configuration to revised SBFD resource configuration for SBFD slots.

In order to provide dynamic UL or DL sub-band conversion or cancellation, aspects of the present disclosure provide techniques to use a downlink control information (DCI) configuration message that modifies the initial SBFD resource configuration 426 that is allocated for communication between the base station and the UE to a revised SBFD resource configuration 428. The initial SBFD resource configuration 426 may, for example, include partitioning one or more of the first SBFD slot 410, second SBFD slot 412, and/or third SBFD slot 414 into at least a first portion of the bandwidth (420 and 424) that is allocated for the DL transmissions 416 and a second portion of the bandwidth (422) is allocated for UL transmissions 418. In other examples, the initial SBFD resource configuration may include one or more of the first SBFD slot 410, second SBFD slot 412, and/or third SBFD slot 414 into at least a first portion of the bandwidth (420 and 424) that is allocated for the flexible SBFD transmissions and a second portion of the bandwidth is allocated for UL transmissions 418 as illustrated in FIG. 4B. Additional or alternative examples for resource configuration, as discussed in more detail below, are illustrated in FIGS. 4C-4H.

Returning to FIG. 4A, in some examples, the base station may transmit a configuration message to the UE in one or more DL slots (404, 406, 408) that modifies 402 the initial SBFD resource configuration 426 for portion of a bandwidth for one or more of first SBFD slot 410, a second SBFD slot 412, or a third SBFD slot 414. The configuration message may be a DCI message transmitted at least N slots prior to the first SBFD slot 410 that is being modified in order to allow the UE sufficient time to decode and process the DCI. In some examples N slots may be two or more slots prior to the first SBFD slot 410 for which the sub-band configuration is to be modified.

The modification 402 of the initial SBFD resource configuration may include either converting or canceling previously scheduled UL or DL communication scheduled within a sub-band of the SBFD slot. For example, a sub-band 422 in one or more of the first SBFD slot 410, a second SBFD slot 412, or a third SBFD slot 414 may be modified 402 from previously scheduled UL communication 418 to the DL communication 416. Thus, the dynamic scheduling of the sub-bands within the SBFD slot 410 may include converting or canceling 402 the initial SBFD resource configuration 426 of one or more SBFD slots to a revised SBFD resource configuration 428 based on the configuration message received from the base station at the UE.

The revised SBFD resource configuration 428 may modify at least one of the first portion of the bandwidth within the first slot (e.g., 422) that was originally allocated for the uplink communication 418 or the second portion of the bandwidth within the first SBFD slot 410 that was originally allocated for the downlink communication 416 in the initial SBFD resource configuration 426. The revised SBFD resource configuration 428 modifies the initial SBFD resource configuration 426 by cancelling or converting the first portion of the bandwidth 422 within the first slot 410 that was originally allocated for the uplink communication 418 to downlink sub-band communication 416 such that the entire first SBFD slot 410 is modified for DL communications 416. Similarly, the second SBFD slot 412 or third SBFD slot 414 may also be modified where the UL communications 418 previously scheduled for sub-band 422 within each slot may be canceled or converted to DL communications 416.

In other cases, such as FIG. 4B, the initial SBFD configuration 426 for one or more of the first SBFD slot 410, a second SBFD slot 412, or a third SBFD slot 414 may include a first portion of the bandwidth (420 and 424) that is allocated for the flexible SBFD transmissions 430 and a second portion of the bandwidth 422 is allocated for UL transmissions 418. The flexible SBFD transmission 430 may allow the UE the flexibility to either transmit UL transmissions 418 or receive DL transmissions 416 in the reserved sub-band based on the traffic. In such instance, the DCI message transmitted in the first DL slot 404 may modify 402 a portion of the bandwidth (e.g., sub-band 422) for one or more of the first SBFD slot 410, a second SBFD slot 412, or a third SBFD slot 414. The modification may include canceling or converting originally scheduled UL transmissions 418 in the second portion of the bandwidth 422 to flexible SBFD transmission 430 such that the entire first SBFD slot 410 (e.g., first and second portion of the bandwidth within the slot) may be scheduled for flexible SBFD transmission 430.

Figure 4C:
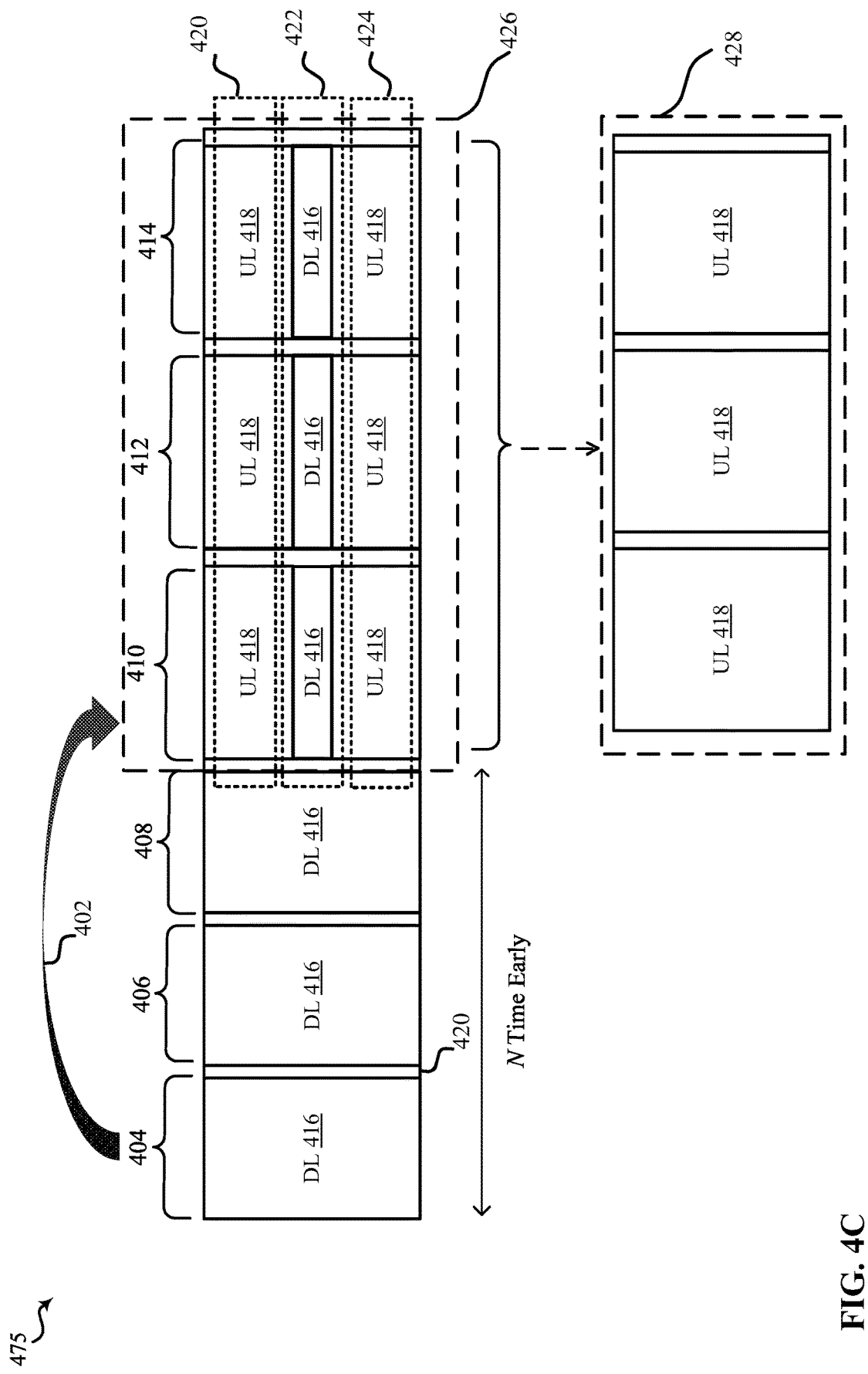
FIG. 4C is another example of dynamics scheduling of SBFD communication resource configuration from initial SBFD resource configuration to revised SBFD resource configuration for SBFD slots.

Referring to FIG. 4C, another case 475 may modify the DL transmissions 416 originally scheduled for a sub-band 422 within one or more of the first SBFD slot 410, a second SBFD slot 412, or a third SBFD slot 414 to an UL transmissions 418 in the revised SBFD resource configuration 428. Thus, in such instance, the revised SBFD resource configuration 428 includes cancelling or converting the second portion of the bandwidth 422 within the first SBFD slot 410 that was originally allocated for the downlink communication 416 to uplink sub-band communication 418. The second portion of the bandwidth (420 and 424) within the first SBFD slot 410 may continue to be allocated for downlink communication 418 for both the initial and revised SBFD configuration.

Figure 4D:
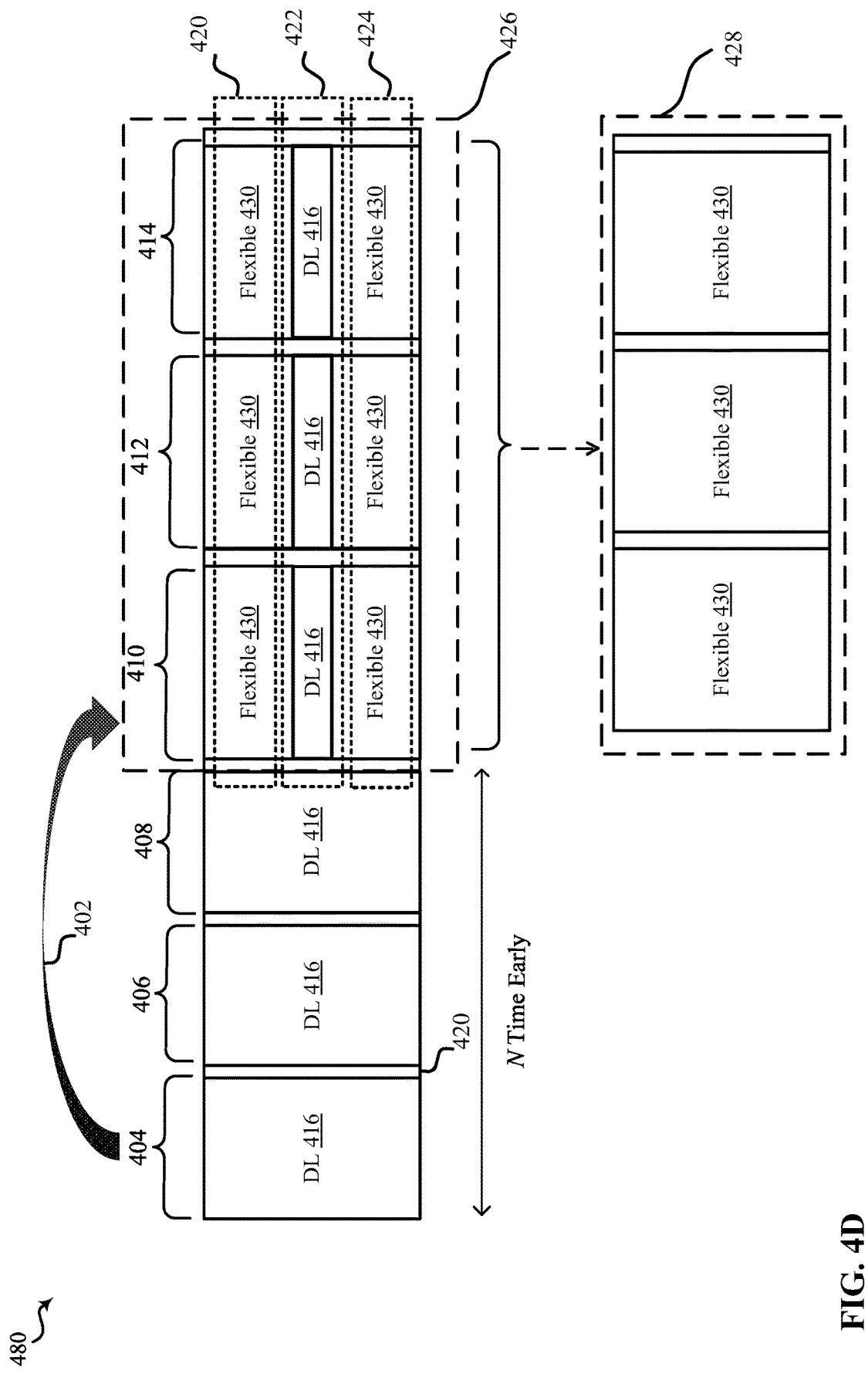
FIG. 4D is another example of dynamics scheduling of SBFD communication resource configuration from initial SBFD resource configuration to revised SBFD resource configuration for SBFD slots.

Yet in another case, as illustrated in FIG. 4D, the DCI message transmitted from the base station to the UE may modify the DL transmissions 416 originally scheduled for a sub-band 422 within one or more of the first SBFD slot 410, a second SBFD slot 412, or a third SBFD slot 414 to flexible SBFD transmission 430 in the revised SBFD resource configuration 428. Thus, in such instance, the revised SBFD resource configuration 428 includes cancelling or converting the second portion of the bandwidth 422 within the first slot that was originally allocated for the downlink communication 416 to flexible sub-band communication 430.

In some examples of FIGS. 4A-4D, the DCI configuration message that is transmitted from the base station to the UE may include or omit scheduling assignment or a group-common DCI (e.g., DCI format 2_0 for SFI). As noted above, the DCI message may be transmitted at least N slots prior to the first SBFD slot that is being modified in order to allow the UE sufficient time to decode and process the DCI. In some examples N slots may be two or more slots prior to the first SBFD slot for which the sub-band configuration is to be modified. The DCI may be a DCI with or without scheduling data. For example, a new bitfield may be added for sub-band cancellation purpose such that the new bitfield may be used by the base station to identify the cancellation of originally schedule DL or UL (or Flexible) sub-band. The new bitfield in the DCI may also indicate whether after cancelation, the sub-band is to be converted to either DL communication 416, UL communication 418, or flexible sub-band communication 430. The DCI message may also indicate if one or more guard bands between each SBFD slot is cancelled and, if so, whether the guard band is converted to be part of DL communication 416, UL communication 418, or flexible sub-band communication 430.

In some aspects, the DCI may also indicate whether the cancellation/conversion is for the current SBFD slot or for next N SBFD slots. Additionally or alternatively, the DCI message may also indicate a slot pattern (e.g. by a bitmap) identifying the sub-bands and SBFD slots that may be converted from initial SBFD resource configuration to the revised SBFD resource configuration. In some aspects, the DCI message may also identify the specific sub-band (e.g., via sub-band identification (ID)) that the base station is modifying from the initial SBFD resource configuration to the revised SBFD resource configuration. However, in scenarios where a single sub-band is being modified as in case of FIGS. 4A-4D, the DCI may not include the sub-band ID. But if more than one sub-band or different portions of the bandwidth within the same SBFD are to be modified, the DCI message may include specific sub-band IDs identifying the sub-bands that may be canceled or converted to revised SBFD resource configuration. Following the modification or conversion/cancellation, the SBFD symbol may fall back to the entire band being dedicated to one of DL communication 416, UL communication 418, or flexible sub-band communication 430 as illustrated in FIGS. 4A-4D for the revised SBFD resource configuration 428.

In other instances, the base station may transmit a DCI configuration messages that modifies one or more sub-bands within the SBFD slots without converting the entire SBFD slot to one of DL communication 416, UL communication 418, or flexible sub-band communication 430. For example, with reference to FIG. 4E, the DCI may indicate to the UE that one of the sub-bands 420 originally scheduled for DL communication 416 is to be canceled and converted for UL communications 418 in the revised SBFD resource configuration 428. In such instance, the entire SBFD slot 410, 412, or 414 is not converted entirely to the UL communications 418. Instead, a portion of the bandwidth in the revised SBFD resource configuration 418 is allocated for UL communications 418 and DL communications 416. But by modifying a single sub-band 420 from DL communication 416 to UL communication 418, revised SBFD resource configuration 428 includes a larger portion of the bandwidth that is allocated for UL communications 418 as compared to the originally scheduled initial SBFD resource configuration 426 for the same SBFD slots.

Figure 4E:
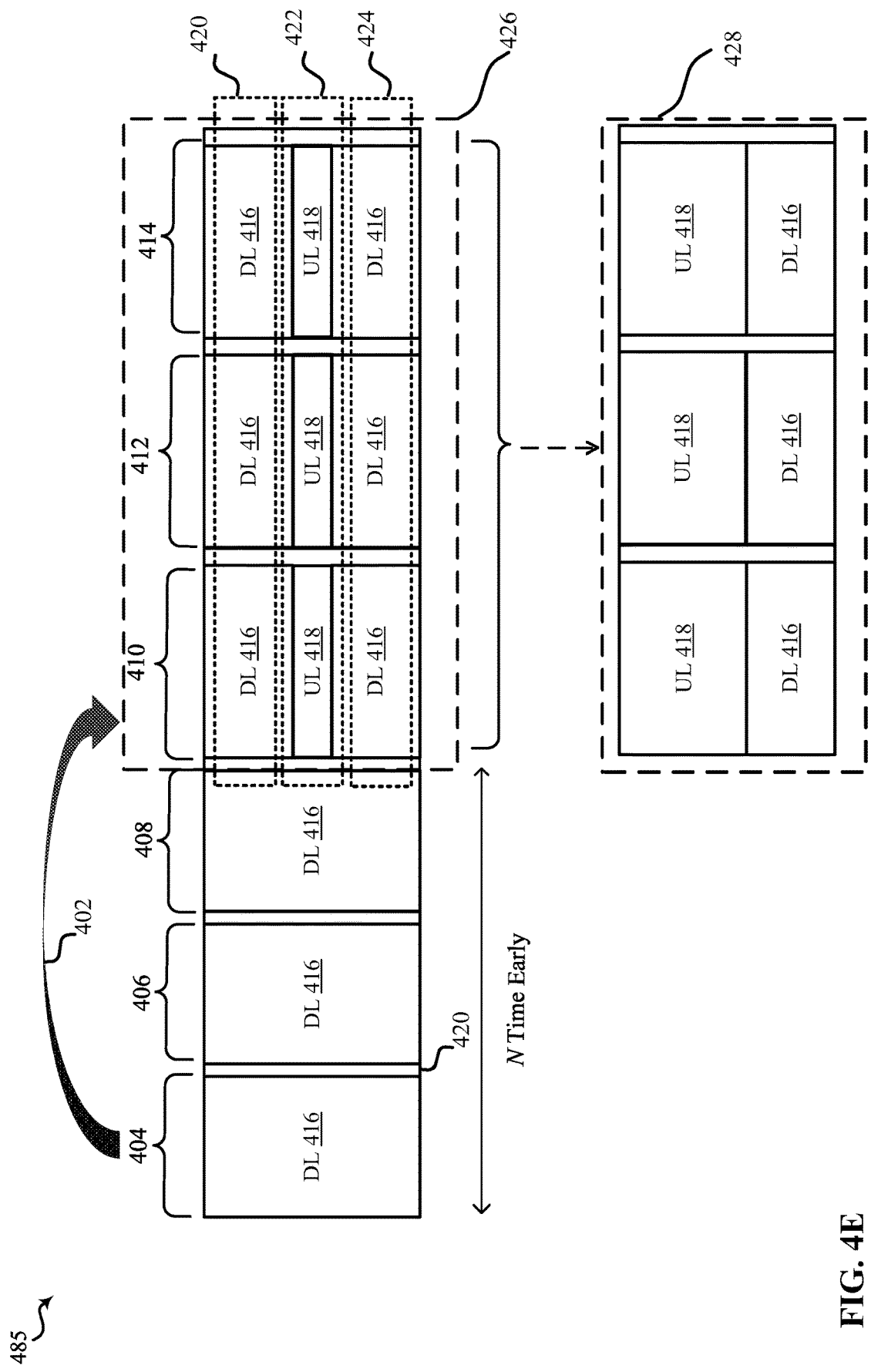
FIG. 4E is another example of dynamics scheduling of SBFD communication resource configuration from initial SBFD resource configuration to revised SBFD resource configuration for SBFD slots.
Figure 4F:
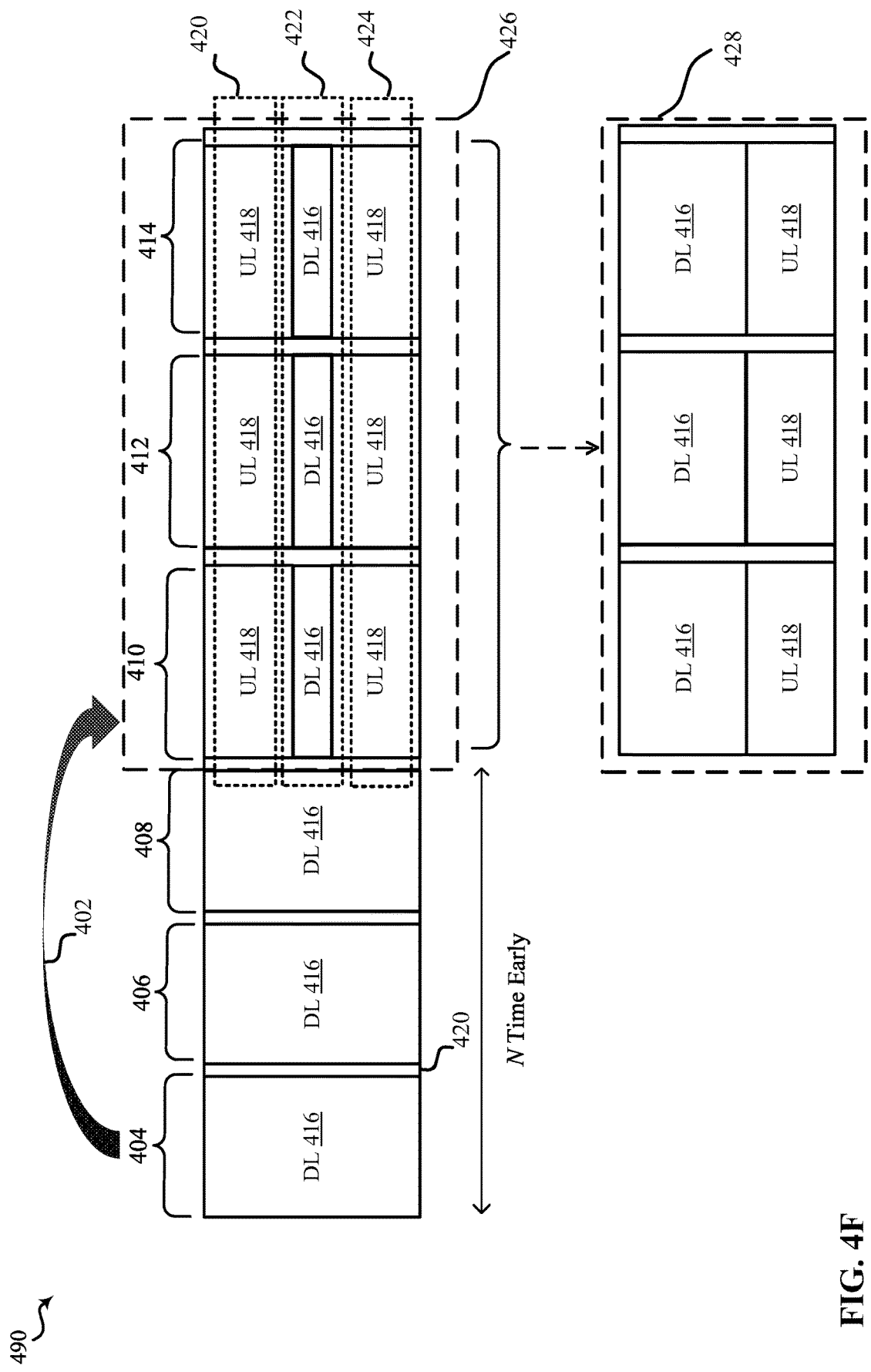
FIG. 4F is another example of dynamics scheduling of SBFD communication resource configuration from initial SBFD resource configuration to revised SBFD resource configuration for SBFD slots.

Similarly, as illustrated in FIG. 4F, another example may include the DCI modifying one of the UL sub-bands originally scheduled for a first sub-band 420 in one or more first SBFD slot 410, second SBFD slot 412, or third SBFD slot 414 for DL communications 416 in the revised SBFD resource configuration 428. In such instance, the DCI may indicate to the UE that one of the sub-bands 420 originally scheduled for UL communication 418 is to be canceled and converted to DL communications 416 or flexible sub-band communications 430 in the revised SBFD resource configuration 428. Again, in such instance, the entire SBFD slot 410, 412, or 414 is not converted entirely to the DL communications 416. Instead, a portion of the bandwidth in the revised SBFD resource configuration 418 is allocated for DL communications 416 and the remaining portion of the SBFD slot remains allocated for UL communications 418. But by modifying a single sub-band 420 from UL communication 418 to DL communication 416, the revised SBFD resource configuration 428 includes a larger portion of the bandwidth that is allocated for DL communications 416 as compared to the originally scheduled initial SBFD resource configuration 426 for the same SBFD slots.

Figure 4G:
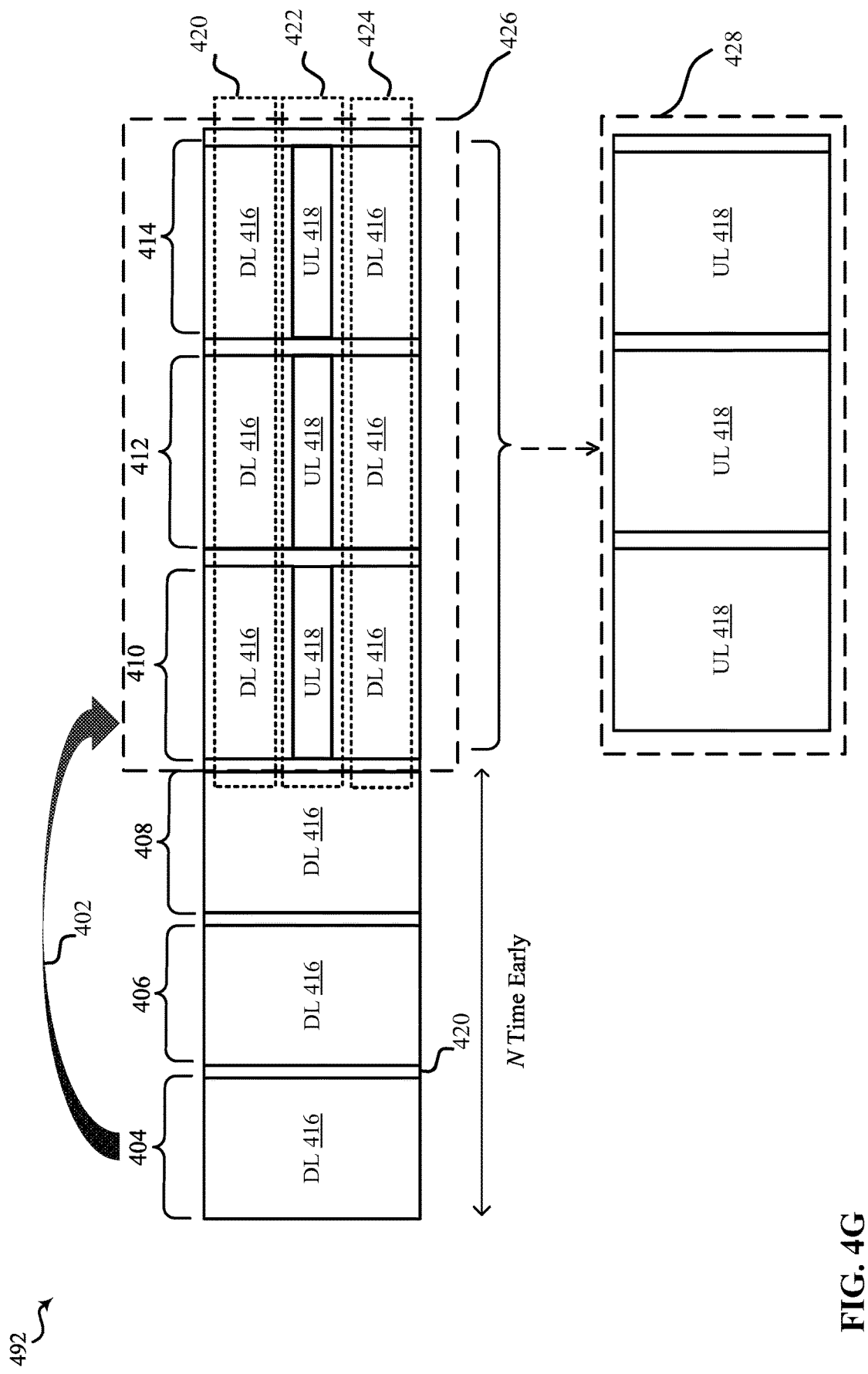
FIG. 4G is another example of dynamics scheduling of SBFD communication resource configuration from initial SBFD resource configuration to revised SBFD resource configuration for SBFD slots.

In another example, as illustrated in FIG. 4G, the DCI message may cancel or convert more than one sub-bands from the initial SBFD resource configuration 426 to the revised SBFD resource configuration 428. In such instances, the first sub-band 420 and a third sub-band 424 that is allocated for DL communications 416 with the SBFD slots (410, 412, or 414) may be converted for UL communications 418 based on the DCI message. However, a second sub-band 422 originally allocated for UL communications 418 may remain unchanged. To accomplish the conversion, the DCI message may include a bitfield that identifies the sub-band IDs associated with the first sub-band 420 and third sub-band 424 with each SBFD slot (410, 412, or 414) that are to be converted to UL or Flexible sub-band communications.

Figure 4H:
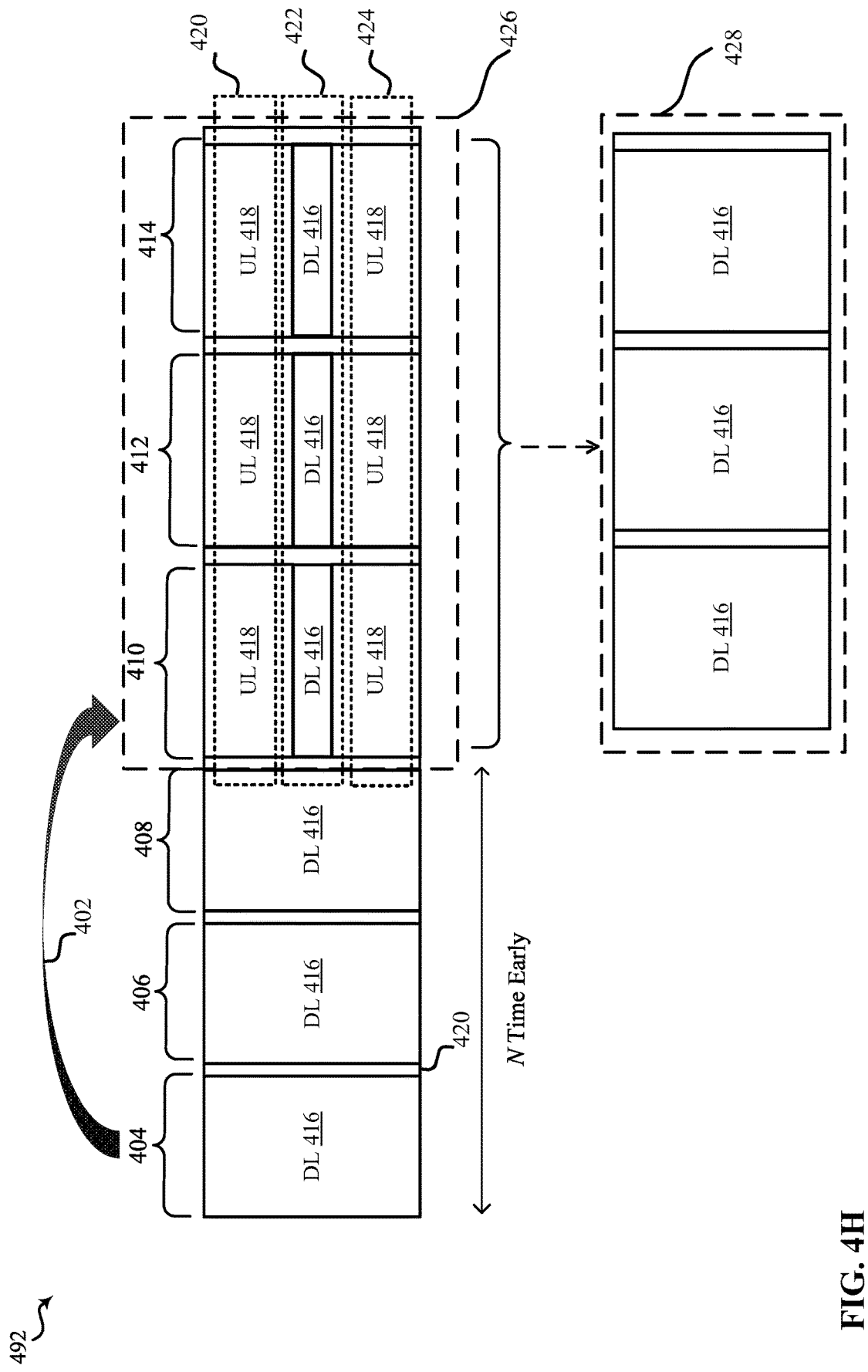
FIG. 4H is another example of dynamics scheduling of SBFD communication resource configuration from initial SBFD resource configuration to revised SBFD resource configuration for SBFD slots.

And in other instances, as illustrated in FIG. 4H, the DCI message may cancel or convert more than one sub-bands originally reserved for UL communication 418 in the initial SBFD resource configuration 426 to DL communications 416 for the revised SBFD resource configuration 428. In such instances, the first sub-band 420 and a third sub-band 424 that is allocated for UL communications 418 within the SBFD slots (410, 412, or 414) may be converted for DL communications 416 based on the DCI message. However, a second sub-band 422 originally allocated for DL communications 416 may remain unchanged.

It should be appreciated by those of ordinary skill in the art that the present disclosure is not limited to the illustrated examples of FIGS. 4A-4H where similar modifications to the initial SBFD resource configuration are made for each of the first SBFD slot 410, second SBFD slot 412, and third SBFD slots 414. Indeed, a person of ordinary skill in the art would recognize that different SBFD slots (410, 412, and 414, etc.) may be individually modified such that the revised SBFD configuration for the first SBFD slot 410 is different than the revised SBFD configuration for the second SBFD slot 412, etc. For example, in some scenarios, the DCI message may modify the UL communication 418 for one sub-band (e.g., 420) in first SBFD slot 410 to DL communication 416. However, for the second SBFD slot 412, the DCI message may cancel and convert the DL communication 416 to UL communication 418. Thus, different combinations of modifications may be achieved by the present disclosure based on a single or multiple DCI configuration messages.

Moreover, for scenarios illustrated in FIGS. 4E-4F, where multiple sub-bands (e.g., first sub-band 420 and third sub-band 424) are canceled and modified, the DCI message may include information related to the sub-band IDs that are to be converted from initial SBFD resource configuration to revised SBFD resource configuration. The sub-band IDs may be preconfigured or configured based on the portion of the bandwidth associated with each sub-band (e.g., sub-band 1, 2, 3, etc.) for each SBFD slot. However, if the entire SBFD slot is converted as illustrated in FIGS. 4G-4H, the DCI message may omit the sub-band IDs. In other instances, the base station may determine whether to include sub-band IDs. Finally, if the modification indications are semi-static, the MAC-CE may be used for cancellation and conversion and the information added in the DCI may be included for the MAC-CE.

FIG. 5 illustrates a hardware components and subcomponents of a device that may be a UE 104 for implementing one or more methods (e.g., method 600) described herein in accordance with various aspects of the present disclosure. The UE 104 may be an example of UE 104 disclosed with reference to FIGS. 1A and 3. For example, one example of an implementation of the UE 104 may include a variety of components, some of which have already been described above, but including components such as one or more processors 512, memory 516 and transceiver 502 in communication via one or more buses 544, which may operate in conjunction with the communication management component 198 to perform functions described herein related to including one or more methods (e.g., 600) of the present disclosure.

Particularly, the communication management component 198 may include a receiving component 520 for receiving, at the UE 104, a configuration message from a base station that modifies an initial SBFD resource configuration that is allocated for communication between the base station and the UE. In some examples, the initial SBFD resource configuration may allow for both downlink and uplink communications on a sub-band basis within a same slot such that at least a first portion of the bandwidth within a first slot is allocated for uplink communication and at least a second portion of the bandwidth within the first slot is allocated for downlink communication.

The communication management component 198 may also include a SBFD scheduling component 525 configured to communicate with the base station on a revised SBFD resource configuration based on the configuration message received from the base station. In some examples, the revised SBFD resource configuration modifies at least one of the first portion of the bandwidth within the first slot that was originally allocated for the uplink communication or the second portion of the bandwidth within the first slot that was originally allocated for the downlink communication in the initial SBFD resource configuration The one or more processors 512, modem 514, memory 516, transceiver 502, RF front end 588 and one or more antennas 565, may be configured to support voice and/or data calls (simultaneously or non-simultaneously) in one or more radio access technologies. In an aspect, the one or more processors 512 can include a modem 514 that uses one or more modem processors. The various functions related to communication management component 198 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with communication management component 198 may be performed by transceiver 502.

The memory 516 may be configured to store data used herein and/or local versions of application(s) 575 or communication management component 198 and/or one or more of its subcomponents being executed by at least one processor 512. The memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining communication management component 198 and/or one or more of its subcomponents, and/or data associated therewith, when the UE 104 is operating at least one processor 512 to execute communication management component 198 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104. Additionally, receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102 or wireless transmissions transmitted by UE 104. The RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 can be used by the RF front end 458 to filter a received signal to obtain an input RF signal. Similarly, in an aspect, for example, a respective filter 596 can be used to filter an output from a respective PA 598 to produce an output signal for transmission. In an aspect, each filter 496 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 588. In an aspect, the transceiver 502 may be tuned to operate at specified frequencies such that transmitting device can communicate with, for example, one or more base stations 102 or one or more cells associated with one or more base stations 102 or other UEs 104. In an aspect, for example, the modem 514 can configure the transceiver 502 to operate at a specified frequency and power level based on the configuration of the transmitting device and the communication protocol used by the modem 514.

In an aspect, the modem 514 can be a multiband-multimode modem, which can process digital data and communicate with the transceiver 502 such that the digital data is sent and received using the transceiver 502. In an aspect, the modem 514 can be multiband and be configured to support multiple frequency bands for a specific communications protocol. In an aspect, the modem 514 can be multimode and be configured to support multiple operating networks and communications protocols. In an aspect, the modem 514 can control one or more components of transmitting device (e.g., RF front end 588, transceiver 502) to enable transmission and/or reception of signals from the network based on a specified modem configuration. In an aspect, the modem configuration can be based on the mode of the modem 514 and the frequency band in use. In another aspect, the modem configuration can be based on UE configuration information associated with transmitting device as provided by the network during cell selection and/or cell reselection.

Referring to FIG. 6, an example method 600 for wireless communications in accordance with aspects of the present disclosure may be performed by one or more UEs 104 discussed with reference to FIGS. 1A, 3, and 5. Although the method 600 is described below with respect to the elements of the UE 104, other components may be used to implement one or more of the steps described herein.

At block 605, the method 600 may include receiving, at the UE, a configuration message from a base station that modifies an initial SBFD resource configuration that is allocated for communication between the base station and the UE. In some examples, the initial SBFD resource configuration allows for both downlink and uplink communications on a sub-band basis within a same slot such that at least a first portion of the bandwidth within a first slot is allocated for uplink communication and at least a second portion of the bandwidth within the first slot is allocated for downlink communication. The configuration message may be received as part of a downlink control information (DCI).

In some examples, the DCI may include one or more bitfields that identify sub-bands within the first slot that are canceled or converted to one of uplink communications, downlink communications, or flexible sub-band communications. The DCI may also identify whether the initial SBFD resource configuration is modified to the revised SBFD resource configuration for either a current slot or a slot that is N slots after the configuration message is received at the UE. If the configuration message that modifies the initial SBFD resource configuration to the revised SBFD resource configuration is semi-static, the information for modifying the initial SBFD resource configuration may be provided to the UE by media access control (MAC) control element.

In some aspects, the antennas 564 may receive signals transmitted from the base station that are processed by the RF front end 588 and transceiver 502. The signals may be forwarded to the modem 514 and processor 512. In some aspects, the communication management component 198 in conjunction with the receiving component 520 that may be part of the modem 514 may decode the received signals to identify the configuration message that is received from the base station.

In certain implementations, the processor 512, the modem 544, the communication management component 198, the receiving component 520 in conjunction with the transceiver 502 and/or one or more other components or subcomponents of the UE 104 may be configured to and/or may define means for receiving, at the UE, a configuration message from a base station that modifies an initial SBFD resource configuration that is allocated for communication between the base station and the UE.

At block 610, the method 600 may include communicating with the base station on a revised SBFD resource configuration based on the configuration message received from the base station, wherein the revised SBFD resource configuration modifies at least one of the first portion of the bandwidth within the first slot that was originally allocated for the uplink communication or the second portion of the bandwidth within the first slot that was originally allocated for the downlink communication in the initial SBFD resource configuration.

In some aspects, communicating with the base station may include transmitting UL messages from the UE to the base station or receiving DL transmissions from the base station to the UE. To facilitate the communication, the SBFD scheduling component 525 as part of the modem 514 may identify the resources that are allocated for the UL or DL communications within each sub-band of the SBFD slots. According to the determination, the modem 514 may generate messages that are converted to UL signals by the transceiver 502 and routed to the base station via the one or more antennas 565. Conversely, to receive DL signals, the SBFD scheduling component 525 may identify the resources that are allocated for DL communications within each sub-band of the SBFD slots in order to determine when the UE expects to receive DL communication. Signals detected by the one or more antennas 565 may be processed by the RF front end 588, transceiver 502, and forwarded to the processor 512 and the modem 514.

In certain implementations, the processor 512, the modem 544, the communication management component 198, the receiving component 520 in conjunction with the transceiver 502 and/or one or more other components or subcomponents of the UE 104 may be configured to and/or may define means for communicating with the base station may include transmitting UL messages from the UE to the base station or receiving DL transmissions from the base station to the UE.

In some examples, the revised SBFD resource configuration that modifies the initial SBFD resource configuration may include cancelling or converting the first portion of the bandwidth within the first slot that was originally allocated for the uplink communication to downlink sub-band communication. In another example, the revised SBFD resource configuration that modifies the initial SBFD resource configuration may include cancelling or converting the first portion of the bandwidth within the first slot that was originally allocated for the uplink communication to flexible sub-band communication. In yet another example, the revised SBFD resource configuration that modifies the initial SBFD resource configuration may include cancelling or converting the second portion of the bandwidth within the first slot that was originally allocated for the downlink communication to uplink sub-band communication. And yet another example, the revised SBFD resource configuration that modifies the initial SBFD resource configuration may include cancelling or converting the second portion of the bandwidth within the first slot that was originally allocated for the downlink communication to flexible sub-band communication.

The first portion of the bandwidth within the first slot that was originally allocated for the uplink communication may include a first sub-band and a second sub-band that are both allocated for the uplink communication, the first sub-band associated with a first sub-band identification (ID) and the second sub-band associated with a second sub-band ID. To this end, the configuration message received from the base station that modifies the initial SBFD resource configuration to the revised SBFD resource configuration may identify one of the first sub-band ID or the second sub-band ID that is cancelled or converted from original allocation for the uplink communication to downlink sub-band communication. The configuration message received from the base station may also modify both of the first sub-band ID and the second sub-band ID from original allocation of uplink communication to downlink sub-band communication.

In some examples, the second portion of the bandwidth within the first slot that was originally allocated for the downlink communication may include a first sub-band and a second sub-band that are both allocated for the downlink communication. The first sub-band may be associated with a first sub-band ID and the second sub-band may be associated with a second sub-band ID. In some examples, the configuration message received from the base station that modifies the initial SBFD resource configuration to the revised SBFD resource configuration may identify one of the first sub-band ID or the second sub-band ID that is cancelled or converted from original allocation for downlink communication to uplink sub-band communication. The configuration message received from the base station may modify both of the first sub-band ID and the second sub-band ID from original allocation for downlink communication to downlink sub-band communication.

In some examples, the configuration message from the base station that modifies the initial SBFD resource configuration is received at least N slots prior to resources that are being modified in order to allow the UE to decode the configuration message. In some examples, N may be two or more slots prior to the resource or slot that is being modified.

The configuration message may also include a bitfield to indicate whether a guard band associated with the first portion of the bandwidth within the first slot allocated for the uplink communication or the second portion of the bandwidth within the first slot allocated for the uplink communication is modified as part of the revised SBFD resource configuration. In some examples, the configuration message received from the base station that modifies the initial SBFD resource configuration to the revised SBFD resource configuration may identify a sub-band ID within the first portion of the bandwidth or the second portion of the bandwidth that is modified as part of the revised SBFD resource configuration.

Some Further Example Clauses

Implementation examples are described in the following numbered clauses:

1. A method for wireless communication, comprising:
    receiving, at a user equipment (UE), a configuration message from a base station that modifies an initial sub-band full duplex (SBFD) resource configuration that is allocated for communication between the base station and the UE, wherein the initial SBFD resource configuration allows for both downlink and uplink communications on a sub-band basis within a same slot such that at least a first portion of the bandwidth within a first slot is allocated for uplink communication and at least a second portion of the bandwidth within the first slot is allocated for downlink communication; and
    communicating with the base station on a revised SBFD resource configuration based on the configuration message received from the base station, wherein the revised SBFD resource configuration modifies at least one of the first portion of the bandwidth within the first slot that was originally allocated for the uplink communication or the second portion of the bandwidth within the first slot that was originally allocated for the downlink communication in the initial SBFD resource configuration.
2. The method of clause 1, wherein the revised SBFD resource configuration that modifies the initial SBFD resource configuration includes cancelling or converting the first portion of the bandwidth within the first slot that was originally allocated for the uplink communication to downlink sub-band communication.
3. The method of any of the preceding clauses 1-2, wherein the revised SBFD resource configuration that modifies the initial SBFD resource configuration includes cancelling or converting the first portion of the bandwidth within the first slot that was originally allocated for the uplink communication to flexible sub-band communication.
4. The method of any of the preceding clauses 1-3, wherein the revised SBFD resource configuration that modifies the initial SBFD resource configuration includes cancelling or converting the second portion of the bandwidth within the first slot that was originally allocated for the downlink communication to uplink sub-band communication.
5. The method of any of the preceding clauses 1-4, wherein the revised SBFD resource configuration that modifies the initial SBFD resource configuration includes cancelling or converting the second portion of the bandwidth within the first slot that was originally allocated for the downlink communication to flexible sub-band communication.
6. The method of any of the preceding clauses 1-5, wherein the first portion of the bandwidth within the first slot that was originally allocated for the uplink communication includes a first sub-band and a second sub-band that are both allocated for the uplink communication, the first sub-band associated with a first sub-band identification (ID) and the second sub-band associated with a second sub-band ID.
7. The method of any of the preceding clauses 1-6, wherein the configuration message received from the base station that modifies the initial SBFD resource configuration to the revised SBFD resource configuration identifies one of the first sub-band ID or the second sub-band ID that is cancelled or converted from original allocation for the uplink communication to downlink sub-band communication.

8. The method of any of the preceding clauses 1-7, wherein the configuration message received from the base station modifies both of the first sub-band ID and the second sub-band ID from original allocation of uplink communication to downlink sub-band communication.

9. The method of any of the preceding clauses 1-8, wherein the second portion of the bandwidth within the first slot that was originally allocated for the downlink communication includes a first sub-band and a second sub-band that are both allocated for the downlink communication, the first sub-band associated with a first sub-band identification (ID) and the second sub-band associated with a second sub-band ID.

10. The method of any of the preceding clauses 1-9, wherein the configuration message received from the base station that modifies the initial SBFD resource configuration to the revised SBFD resource configuration identifies one of the first sub-band ID or the second sub-band ID that is cancelled or converted from original allocation for downlink communication to uplink sub-band communication.

11. The method of any of the preceding clauses 1-10, wherein the configuration message received from the base station modifies both of the first sub-band ID and the second sub-band ID from original allocation for downlink communication to downlink sub-band communication.

12. The method of any of the preceding clauses 1-11, wherein the configuration message from the base station that modifies the initial SBFD resource configuration is received at least N slots prior to resources that are being modified in order to allow the UE to decode the configuration message.

13. The method of any of the preceding clauses 1-12, wherein the configuration message includes a bitfield to indicate whether a guard band associated with the first portion of the bandwidth within the first slot allocated for the uplink communication or the second portion of the bandwidth within the first slot allocated for the uplink communication is modified as part of the revised SBFD resource configuration.

14. The method of any of the preceding clauses 1-13, wherein the configuration message received from the base station that modifies the initial SBFD resource configuration to the revised SBFD resource configuration identifies a sub-band identification (ID) within the first portion of the bandwidth or the second portion of the bandwidth that is modified as part of the revised SBFD resource configuration.

15. The method of any of the preceding clauses 1-14, wherein the configuration message is received as part of a downlink control information.

16. The method of any of the preceding clauses 1-15, wherein the DCI includes one or more bitfields that identify sub-bands within the first slot that are canceled or converted to one of uplink communications, downlink communications, or flexible sub-band communications.

17. The method of any of the preceding clauses 1-16, wherein the DCI identifies whether the initial SBFD resource configuration is modified to the revised SBFD resource configuration for either a current slot or a slot that is N slots after the configuration message is received at the UE.

18. The method any of the preceding clauses 1-17, wherein the configuration message that modifies the initial SBFD resource configuration to the revised SBFD resource configuration is semi-static and information for modifying the initial SBFD resource configuration is provided to the UE by media access control (MAC) control element.

19. An apparatus for wireless communication by a user equipment, comprising:
a memory; and
a processor coupled with the memory and configured to:
receive, at a user equipment (UE), a configuration message from a base station that modifies an initial sub-band full duplex (SBFD) resource configuration that is allocated for communication between the base station and the UE, wherein the initial SBFD resource configuration allows for both downlink and uplink communications on a sub-band basis within a same slot such that at least a first portion of the bandwidth within a first slot is allocated for uplink communication and at least a second portion of the bandwidth within the first slot is allocated for downlink communication; and
communicate with the base station on a revised SBFD resource configuration based on the configuration message received from the base station, wherein the revised SBFD resource configuration modifies at least one of the first portion of the bandwidth within the first slot that was originally allocated for the uplink communication or the second portion of the bandwidth within the first slot that was originally allocated for the downlink communication in the initial SBFD resource configuration.

20. A non-transitory computer readable medium storing instructions, executable by a processor, for wireless communications, comprising instructions for:
receiving, at a user equipment (UE), a configuration message from a base station that modifies an initial sub-band full duplex (SBFD) resource configuration that is allocated for communication between the base station and the UE, wherein the initial SBFD resource configuration allows for both downlink and uplink communications on a sub-band basis within a same slot such that at least a first portion of the bandwidth within a first slot is allocated for uplink communication and at least a second portion of the bandwidth within the first slot is allocated for downlink communication; and
communicating with the base station on a revised SBFD resource configuration based on the configuration message received from the base station, wherein the revised SBFD resource configuration modifies at least one of the first portion of the bandwidth within the first slot that was originally allocated for the uplink communication or the second portion of the bandwidth within the first slot that was originally allocated for the downlink communication in the initial SBFD resource configuration.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if", "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication, comprising:
receiving, at a user equipment (UE), a configuration message from a base station that modifies an initial sub-band full duplex (SBFD) resource configuration that is allocated for communication between the base station and the UE, wherein the initial SBFD resource configuration allows for both downlink and uplink communications on a sub-band basis within a same slot such that at least a first portion of bandwidth within a first slot is allocated for uplink communication and at least a second portion of the bandwidth within the first slot is allocated for downlink communication, wherein the configuration message is received as part of a downlink control information (DCI) that includes one or more bitfields that identify sub-bands within the first slot that are canceled or converted to one of uplink communications, downlink communications, or flexible sub-band communications; and
communicating with the base station on a revised SBFD resource configuration based on the configuration message received from the base station, wherein the revised SBFD resource configuration modifies at least one of the first portion of the bandwidth within the first slot that was originally allocated for the uplink communication or the second portion of the bandwidth within the first slot that was originally allocated for the downlink communication in the initial SBFD resource configuration.

2. The method of claim 1, wherein the revised SBFD resource configuration that modifies the initial SBFD resource configuration includes cancelling or converting the first portion of the bandwidth within the first slot that was originally allocated for the uplink communication to downlink sub-band communication.

3. The method of claim 1, wherein the revised SBFD resource configuration that modifies the initial SBFD resource configuration includes cancelling or converting the first portion of the bandwidth within the first slot that was originally allocated for the uplink communication to flexible sub-band communication.

4. The method of claim 1, wherein the revised SBFD resource configuration that modifies the initial SBFD resource configuration includes cancelling or converting the second portion of the bandwidth within the first slot that was originally allocated for the downlink communication to uplink sub-band communication.

5. The method of claim 1, wherein the revised SBFD resource configuration that modifies the initial SBFD resource configuration includes cancelling or converting the second portion of the bandwidth within the first slot that was originally allocated for the downlink communication to flexible sub-band communication.

6. The method of claim 1, wherein the first portion of the bandwidth within the first slot that was originally allocated for the uplink communication includes a first sub-band and a second sub-band that are both allocated for the uplink communication, the first sub-band associated with a first sub-band identification (ID) and the second sub-band associated with a second sub-band ID.

7. The method of claim 6, wherein the configuration message received from the base station that modifies the initial SBFD resource configuration to the revised SBFD resource configuration identifies one of the first sub-band ID or the second sub-band ID that is cancelled or converted from original allocation for the uplink communication to downlink sub-band communication.

8. The method of claim 6, wherein the configuration message received from the base station modifies both of the first sub-band ID and the second sub-band ID from original allocation of the uplink communication to downlink sub-band communication.

9. The method of claim 1, wherein the second portion of the bandwidth within the first slot that was originally allocated for the downlink communication includes a first sub-band and a second sub-band that are both allocated for the downlink communication, the first sub-band associated with a first sub-band identification (ID) and the second sub-band associated with a second sub-band ID.

10. The method of claim 9, wherein the configuration message received from the base station that modifies the initial SBFD resource configuration to the revised SBFD resource configuration identifies one of the first sub-band ID or the second sub-band ID that is cancelled or converted from original allocation for downlink communication to uplink sub-band communication.

11. The method of claim 9, wherein the configuration message received from the base station modifies both of the first sub-band ID and the second sub-band ID from original allocation for the downlink communication to downlink sub-band communication.

12. The method of claim 1, wherein the configuration message from the base station that modifies the initial SBFD resource configuration is received at least N slots prior to resources that are being modified in order to allow the UE to decode the configuration message.

13. The method of claim 1, wherein the configuration message includes a bitfield to indicate whether a guard band associated with the first portion of the bandwidth within the first slot that was originally allocated for the uplink communication or the second portion of the bandwidth within the first slot that was originally allocated for the downlink communication is modified as part of the revised SBFD resource configuration.

14. The method of claim 1, wherein the configuration message received from the base station that modifies the initial SBFD resource configuration to the revised SBFD resource configuration identifies a sub-band identification (ID) within the first portion of the bandwidth or the second portion of the bandwidth that is modified as part of the revised SBFD resource configuration.

15. The method of claim 1, wherein the DCI identifies whether the initial SBFD resource configuration is modified to the revised SBFD resource configuration for either a current slot or a slot that is N slots after the configuration message is received at the UE.

16. The method of claim 1, wherein the configuration message that modifies the initial SBFD resource configuration to the revised SBFD resource configuration is semi-static and information for modifying the initial SBFD resource configuration is provided to the UE by media access control (MAC) control element.

17. The method of claim 1, wherein the bitfield indicates a sub-band identification of a sub-band that the base station is modifying from the initial SBFD resource configuration to the revised SBFD resource configuration.

18. The method of claim 1, wherein the bitfield indicates multiple sub-band identifiers of multiple sub-bands that the base station is modifying from the initial SBFD resource configuration to the revised SBFD resource configuration.

19. The method of claim 1, wherein the bitfield indicates whether after cancelation, the sub-band is to be converted to either DL communication, UL communication, or flexible sub-band communication.

20. The method of claim 1, wherein the bitfield indicates a number of slots for which the revised SBFD resource configuration is applied.

21. An apparatus for wireless communication by a user equipment, comprising:

a memory; and
a processor coupled with the memory and configured to:
receive, at a user equipment (UE), a configuration message from a base station that modifies an initial sub-band full duplex (SBFD) resource configuration that is allocated for communication between the base station and the UE, wherein the initial SBFD resource configuration allows for both downlink and uplink communications on a sub-band basis within a same slot such that at least a first portion of bandwidth within a first slot is allocated for uplink communication and at least a second portion of the bandwidth within the first slot is allocated for downlink communication, wherein the configuration message is received as part of a downlink control information (DCI) that includes one or more bitfields that identify sub-bands within the first slot that are canceled or converted to one of uplink communications, downlink communications, or flexible sub-band communications; and
communicate with the base station on a revised SBFD resource configuration based on the configuration message received from the base station, wherein the revised SBFD resource configuration modifies at least one of the first portion of the bandwidth within the first slot that was originally allocated for the uplink communication or the second portion of the bandwidth within the first slot that was originally allocated for the downlink communication in the initial SBFD resource configuration.

22. A non-transitory computer readable medium storing instructions, executable by a processor, for wireless communications, comprising instructions for:
receiving, at a user equipment (UE), a configuration message from a base station that modifies an initial sub-band full duplex (SBFD) resource configuration that is allocated for communication between the base station and the UE, wherein the initial SBFD resource configuration allows for both downlink and uplink communications on a sub-band basis within a same slot such that at least a first portion of bandwidth within a first slot is allocated for uplink communication and at least a second portion of the bandwidth within the first slot is allocated for downlink communication, wherein the configuration message is received as part of a downlink control information (DCI) that includes one or more bitfields that identify sub-bands within the first slot that are canceled or converted to one of uplink communications, downlink communications, or flexible sub-band communications; and
communicating with the base station on a revised SBFD resource configuration based on the configuration message received from the base station, wherein the revised SBFD resource configuration modifies at least one of the first portion of the bandwidth within the first slot that was originally allocated for the uplink communication or the second portion of the bandwidth within the first slot that was originally allocated for the downlink communication in the initial SBFD resource configuration.

* * * * *